United States Patent [19]

James et al.

[11] 4,097,468

[45] Jun. 27, 1978

[54] PROCESS FOR PREPARING POLYESTERS

[75] Inventors: Leonard Evans James, Richmond; Laszlo Joseph Balint, Chester; Stanley David Lazarus, Petersburg, all of Va.

[73] Assignee: Allied Chemical Corporation, Morris Township, Morris County, N.J.

[21] Appl. No.: 777,819

[22] Filed: Mar. 15, 1977

[51] Int. Cl.$^2$ .............................................. C08G 63/18
[52] U.S. Cl. .................................... 260/75 M; 560/94
[58] Field of Search ........................ 260/75 M, 475 P; 560/94

[56] References Cited

U.S. PATENT DOCUMENTS

| | | |
|---|---|---|
| 3,689,461 | 9/1972 | Balint et al. ........................ 260/75 M |
| 3,697,579 | 10/1972 | Balint et al. .................. 260/75 M X |
| 3,849,379 | 11/1974 | Jeurissen et al. .................. 260/75 M |

*Primary Examiner*—Lucille M. Phynes
*Attorney, Agent, or Firm*—Fred L. Kelly

[57] ABSTRACT

In a process for the preparation of high molecular weight linear polyesters of terephthalic acid which comprises partially esterifying terephthalic acid with an alkylene glycol under direct esterification conditions and then further esterifying and polycondensing the partially esterified product, the molecular weight distribution of the polyester is narrowed by correlating the carboxyl conversion with the reacted glycol to terephthalic acid mol ratio in various steps of a multistep process.

8 Claims, No Drawings

PROCESS FOR PREPARING POLYESTERS

BACKGROUND OF THE INVENTION

The present invention relates to a process for producing polyesters from terephthalic acid and an alkylene glycol and more particularly a process for producing polyethylene terephthalate from terephthalic acid and ethylene glycol.

Heretofore, polyethylene terephthalate has been generally produced by an ester interchange process which passes through bis-($\beta$-hydroxyethyl) terephthalate from dimethyl terephthalate and ethylene glycol and by a direct process which passes through bis-($\beta$-hydroxyethyl) terephthalate directly from terephthalic acid and ethylene glycol.

The ester interchange process which uses dimethyl terephthalate as a starting material has advantages that dimethyl terephthalate has a relatively low melting point and is easily soluble and therefore dimethyl terephthalate and ethylene glycol react uniformly and bis-($\beta$-hydroxyethyl) terephthalate, which is an intermediate of polyethylene terephthalate, can be easily obtained and that impurities contained in terephthalic acid are removed in the step for producing dimethyl terephthalate. This process needs an extra step for esterifying terephthalic acid with methyl alcohol to produce dimethyl terephthalate and further it is necessary to remove methyl alcohol by-produced in the ester interchange step. Consequently, this process has not been fully satisfactory from the viewpoints of apparatus and operation efficiency.

On the other hand, the direct process is superior theoretically to the ester interchange process but it has various problems in practice. Namely, terephthalic acid is not soluble in ethylene glycol and is generally low in apparent density and consequently it is difficult for terephthalic acid to be homogeneously dispersed in or mixed with an amount of ethylene glycol theoretically required for the esterification. In addition, sidereaction products, such as diethylene glycol produced by an etherification reaction of ethylene glycol during the esterification reaction are formed and the qualities of fibers or films manufactured from the resulting polyethylene terephthalate are considerably degraded.

In order to obviate such defects in the direct esterification process, a large number of proposals have already been made. For example, U.S. Pat. Nos. 3,442,868, 3,496,220, 3,590,072, 3,655,729, 3,781,213, 3,819,585 and 3,849,379 illustrate various process improvements in the direct esterification route of preparing linear polyesters. However, the most pertinent prior art is believed to be U.S. Pat. No. 3,689,461 which discloses an improved process that features direct esterification of a flowable uniform dispersion comprised of a paste of a polycarboxylic acid and a polyol with which has been admixed a prepolymerized product of like reactants. The product of this esterification is then further esterified and polycondensed to obtain a polyester of desired molecular weight.

Although the process of U.S. Pat. No. 3,689,461 has met with considerable commercial success, research in this field has been continued in an effort to improve upon this patented process. In particular, research efforts have centered on development of a process to provide an improved polyester that is more uniform than prior art products. Desirably, said relatively uniform polyester should have high molecular weight, be relatively free of ether linkages, have a low content of chloroform-soluble materials and a relatively narrow molecular weight distribution as estimated from the weight average molecular weight $\overline{M}_w$ as compared with the number average molecular weight $\overline{M}_n$. It is well known in this art that polymer uniformity is important in production of high quality yarn. It is also known that a comparison of $\overline{M}_w$ and $\overline{M}_n$ is desirable because the weight average is particularly sensitive to the presence of larger species, whereas the number average is sensitive to the proportion by weight of smaller molecules.

SUMMARY OF THE INVENTION

Therefore, it is a prime object of this invention to provide an improved process for the direct esterification of terephthalic acid with an alkylene glycol.

Another object of this invention is to provide an improved process for directly preparing polyesters having improved uniformity, which polyesters can be conveniently processed into fibers, filaments, films and other shaped articles as a continuous or discontinuous process.

Another object is to provide a more economical process than heretofore and one which is capable of being operated continuously over an indefinite period of time.

Still another object is to provide an improved process wherein the formation of objectionable ethers such as diethylene glycol is inhibited during the esterification reaction, even in the absence of added ether inhibitors.

These and other objects are accomplished in accordance with this invention by a process which may be summarized as follows:

In a process for the preparation of high molecular weight linear polyesters of terephthalic acid which comprises partially esterifying terephthalic acid with an alkylene glycol containing 2 to 10 carbon atoms per molecule under direct esterification conditions and then further esterifying and polycondensing the partially esterified product until there is obtained a polyester of the desired molecular weight, the improvement which comprises:

(a) continuously subjecting to conditions of direct esterification at a temperature of 260°–300° C. and a pressure of 100–150 psig. a flowable, uniform dispersion comprised of (1) a paste consisting of said terephthalic acid, about 1.0 to 1.2 mols of said alkylene glycol per mol of terephthalic acid, and about 0.4 to 1.8 mols of water per mol of terephthalic acid, and (2) about 20 to about 40 parts by weight per part of paste of a partially esterified product of said terephthalic acid with said alkylene glycol, said partially esterified product having a reacted glycol to terephthalic acid mol ratio between 0.9 and 1.2 and a carboxyl conversion of about 70 to 80 percent, said partially esterified product being continuously recycled to the esterification zone at a temperature of 260°–300° C. and a pressure of 100–150 psig. and said paste being continuously added thereto at a predetermined point in the recycle system;

(b) continuously withdrawing a portion of the partially esterified product from step (a) equivalent to the terephthalic acid added in step (a), and continuously reacting said portion of the partially esterified product with about 0.5 to 0.7 mol of said alkylene glycol per mol of terephthalic acid added in step (a), said reaction being carried out at a temperature of 260°–300° C. and a pressure of 70–120 psig, thereby producing an esterified product having a reacted glycol to terephthalic acid mol ratio between 1.4 and 1.8 and a carboxyl conversion of about 90 to 95 percent;

(c) continuously further esterifying the esterification product of step (b) at a temperature of 260°–300° C. and a pressure of 300 to 400 mm of Hg to produce an esterified product having a reacted glycol to terephthalic acid mol ratio between 1.1 and 1.2 and a carboxyl conversion of 96 to 99 percent; and (d) further esterifying and polycondensing the esterification product of step (c) at a temperature of 260°–300° C. and a pressure less than 300 mm Hg until there is obtained an improved polyester of the desired molecular weight.

DESCRIPTION OF THE PREFERRED EMBODIMENT

In prior art processes for preparation of polyesters, such as that of U.S. Pat. No. 3,689,461, efficiency of esterification has been measured in terms of carboxyl conversion. However, we have found that the reacted glycol to terephthalic acid mol ratio is just as critical, if not more so, in describing esterification efficiency and in determining polymer properties. Optimum results are obtained by correlating the carboxyl conversion with the reacted glycol to terephthalic acid mol ratio in each esterification step of the process. Results indicate that as glycol to terephthalic acid mol ratio decreases the mol fraction of di-COOH ended species increases, even at constant conversion. Accordingly, a relatively high reacted glycol to terephthalic acid mol ratio is necessary in the present process, especially in the esterification steps of the overall process. The close relationship between reacted glycol ratio and molecular weight distribution in the polymer is particularly important in production of improved fiber.

In accordance with the preferred process of this invention, terephthalic acid is continuously fed to a mixer together with about 1.1 to 1.2 mols of ethylene glycol per mol of terephthalic acid and about 1.1 to 1.8 mols of water per mol of terephthalic acid. Optionally, a catalyst (esterification and/or polycondensation) is added to the mixture. In the mixer, agitation is performed whereby the terephthalic acid, ethylene glycol, water and catalyst are converted to a paste. The paste mixture is then pumped from the mixer by a feed pump to the inlet of a circulating pump where the paste mixture is combined with about 30 to 40 parts by weight per part of paste of recirculating or recycle partially esterified product described hereinafter. The resulting mixture is pumped by the circulating pump through a heater, for example, a multiple tube heat exchanger. Effluent from the heater passes to a first reaction zone, for example, a reactor-separator, for vapor-liquid separation and esterification at a pressure of about 120 to 130 psig and a temperature of 260°–280° C. Part of esterified effluent having a reacted glycol to terephthalic acid mol ratio between 0.9 and 1.1 and a carboxyl conversion of about 70 to 75 percent is returned to the inlet of the circulating pump where it is combined with fresh paste.

The remainder of the effluent from the first reaction zone, equivalent to the terephthalic acid added to the process in the paste, is metered to a second reaction zone together with about 0.5 to 0.7 mol of ethylene glycol per mol of terephthalic acid added in said paste. In the second reaction zone, for example, a reactor-separator, further esterification and vapor-liquid separation takes place at a pressure of 90 to 100 psig and a temperature of 270° to 280° C., thereby producing an esterified product having a reacted glycol to terephthalic acid mol ratio between 1.4 and 1.6, and a carboxyl conversion of 90 to 95 percent.

The effluent from the second reaction zone is transferred to a third reaction zone, for example, a reactor-separator, for further esterification and vapor-liquid separation at a pressure of 300 to 400 mm Hg and a temperature of 270°–280° C., thereby producing an esterified product having a reacted glycol to terephthalic acid mol ratio between 1.1 and 1.2 and a carboxyl conversion of 97 to 99 percent.

The effluent from the third reaction zone is preferably processed through three stages of polycondensation at a temperature of 270°–300° C. and a pressure less than 300 mm Hg, desirably 0.5 to 100 mm Hg, until there is obtained an improved polyethylene terephthalate having an intrinsic viscosity suitable for the production of tire yarn.

The following examples illustrate technical advantages of the present invention. All parts and percentages are by weight unless otherwise indicated.

EXAMPLE 1

About 41.5 parts per hour of purified terephthalic acid, 18.1 parts per hour of ethylene glycol, 7.3 parts per hour of water, 0.06 part per hour of antimony acetate, and 0.08 part per hour of diisopropylamine are continuously fed to a paddle wheel mixer where they are converted to a paste. The paste mixture at ambient temperature is then pumped from the mixer by a feed pump to the inlet of a circulating pump where it is combined with 40 parts per part of paste of recirculating or recycle, partially esterified product described hereinafter. The resulting mixture is pumped by the circulating pump through a multiple tube and shell heat exchanger where it is heated to about 275° C. After leaving the heat exchanger, the mixture enters a first reactor-separator for vapor-liquid separation and esterification. This reactor-separator is maintained at about 275° C. by conventional heating means, and about 125 psig pressure by means of an automatic vent valve. Residence time in the reactor is about 0.5 hour. The partially esterified product has a reacted glycol to terephthalic acid mol ratio of 1.0 and a carboxyl conversion of 70 percent.

The reaction mixture leaving the first reactor-separator is split, with part returned to the inlet of the circulating pump where it is combined with fresh paste and part (equivalent to the terephthalic acid added to the process in the paste) is metered to a second reactor-separator via a pipeline into which is injected 0.6 mol of ethylene glycol per mol of terephthalic acid added in said paste. In the second reactor-separator, further esterification and vapor-liquid separation takes place at a pressure of 100 psig and a temperature of 275° C. Residence time in this reactor is 0.5–1 hour. The product has a reacted glycol to terephthalic acid mol ratio of 1.5 and a carboxyl conversion of 95 percent.

The reaction mixture leaving the second reactor-separator is transferred to a third reactor-separator for further esterification and vapor-liquid separation. The third reactor-separator is maintained at a temperature of 275° C. and 350 mm Hg pressure. Residence time in this reactor is 1–2 hours. The product has a reacted glycol to terephthalic acid mol ratio of 1.14 and a carboxyl conversion of 99 percent. The degree of polymerization is about 6. This product is continuously fed into the first of a series of three polycondensation reactors. The first polycondensation reactor is maintained at a temperature of 275° C. and a pressure of 50 mm Hg; the second polycondensation reactor is maintained at a temperature of 285° C. and a pressure of 2 mm Hg; and the third polycondensation reactor is maintained at a temperature of 295° C. and a pressure of 0.5 mm Hg. The final reactor in the series of three polycondensation reactors is an essentially horizontal totally enclosed cylindrical reactor having an essentially horizontal polyester flow, a pool of polyester in its lower portion, and driven wheels to create high surface area in the polyester to facilitate evaporation of volatiles from the polymer. A preferred reactor is described in detail in U.S. Pat. No. 3,976,431. Excellent results are also obtained with use of the reactor described in U.S. Pat. No. 3,728,083.

The polyethylene terephthalate polyester issuing from the last reactor stage has average intrinsic viscosity of 0.96 dl/g. The molecular weight distribution of this polyester is relatively narrow as indicated by the fact that the ratio of the weight average molecular weight ($\overline{M}_w$) to the number average molecular weight ($\overline{M}_n$) is less than 2.25. The diethylene glycol content is 0.9 percent and the content of chloroform-soluble materials is less than 1.6 percent. The polyester from the last reactor stage is passed at a temperature of 295° C. through a filter distribution plate to a 192-hole spinnerette, and processed into 1300 denier yarn. Quality of the yarn produced is excellent, i.e., tenacity is 9.2 gpd and elongation at break is 14 percent. Moreover, in comparison with the yarn produced in accordance with the process of U.S. Pat. No. 3,689,461, the percentage of yarn defects is decreased by about 7 percent. This improvement is attributed to the improved uniformity of the polyester prepared by the process of the present invention.

EXAMPLE 2

The procedure of Example 1 is followed except that the pressure in the first reactor-separator is varied over the range 100 to 150 psig and the pressure in the second reactor-separator is varied over the range 70 to 120 psig. The process is found operable within these ranges; however, a direct relationship between pressure and reacted glycol to terephthalic acid mol ratio is established. Accordingly, a relatively high pressure in these reactors is preferred because we have found that as reacted glycol to terephthalic acid mol ratio increased, the molecular weight distribution of the final polyester is narrowed and yarn quality improves. We hypothesize that dicarboxylic ended oligomers are less reactive than oligomers containing hydroxyethyl end groups and that they tend to broaden the molecular weight distribution.

EXAMPLE 3

The procedure of Example 1 is followed except that a vapor monitor is installed on the vapor line from the first reactor-separator to monitor carboxyl conversion and reacted glycol to terephthalic acid mol ratio. The carboxyl conversion (C) can be estimated from the equation:

$$C = \frac{\text{Mols of H}_2\text{O Produced}}{2\,(\text{Mols of Terephthalic Acid in Feed})}$$

Further, the reacted mol ratio (R) of ethylene glycol (EG) to terephthalic acid (TPA) can be estimated from the equation:

$$R = \frac{(\text{Mols }EG\text{ in Feed}) - (\text{mols }EG\text{ Out in Liquid and Vapor})}{\text{Mols }TPA\text{ in Feed}}$$

Use of the vapor monitor significantly improved control of the process within the required limits.

We claim:

1. In a continuous process for the preparation of high molecular weight linear polyesters of terephthalic acid which comprises partially esterifying terephthalic acid with an alkylene glycol containing 2 to 10 carbon atoms per molecule under direct esterification conditions and then further esterifying and polycondensing the partially esterified product until there is obtained a polyester of the desired molecular weight, the improvement which comprises:

(a) continuously subjecting to conditions of direct esterification at a temperature of 270°-280° C. and a pressure of 100-150 psig a flowable, uniform dispersion comprised of (1) a paste consisting of said terephthalic acid, about 1.0 to 1.2 mols of said alkylene glycol per mole of terephthalic acid, and about 0.4 to 1.8 mols of water per mol of terephthalic acid, and (2) about 20 to about 40 parts by weight per part of paste of a partially esterified product of said terephthalic acid with said alkylene glycol, said partially esterified product having a reacted glycol to terephthalic acid mol ratio between 0.9 and 1.2 and a carboxyl conversion of about 70 to 80 percent, said partially esterified product being continuously recycled to the esterification zone at a temperature of 270°-280° C. and a pressure of 100-150 psig and said paste being continuously added thereto at a predetermined point in the recycle system;

(b) continuously withdrawing a portion of the partially esterified product from step (a) equivalent to the terephthalic acid added in step (a), and continuously reacting said portion of the partially esterified product with about 0.5 to 0.7 mol of said alkylene glycol per mol of terephthalic acid added in step (a), said reaction being carried out at a temperature of 270°-280° C. and a pressure of 90-100 psig, thereby producing an esterified product having a reacted glycol to terephthalic acid mol ratio between 1.4 and 1.6 and a carboxyl conversion of about 90 to 95 percent;

(c) continuously further esterifying the esterification product of step (b) at a temperature of 270°-280° C. and a pressure of 300 to 400 mm of Hg to produce an esterified product having a reacted glycol to terephthalic acid mol ratio between 1.1 and 1.2 and a carboxyl conversion of 97 to 99 percent; and (d) continuously further esterifying and polycondensing the esterification product of step (c) at a temperature of 260°-300° C. and a pressure less than 300 mm Hg until there is obtained an improved polyester of the desired molecular weight, whereby the molecular weight distribution of said polyester is restricted so that the ratio of the weight average molecular weight to the number average molecular weight is less than 2.25.

2. The process of claim 1 wherein said esterification reaction in step (a) is carried out at a pressure of 120-130 psig until the partially esterified product has a reacted glycol to terephthalic acid mol ratio between 0.9 and 1.1 and a carboxyl conversion of about 70 to 75 percent.

3. The process of claim 1 wherein said partially esterified product from step (a) having a reacted glycol to terephthalic acid mol ratio of between 0.9 and 1.1 is reacted in step (b) with about 0.6 mole of said alkylene glycol until the esterified product has a reacted glycol to terephthalic acid mol ratio between 1.4 and 1.6.

4. The process of claim 1 wherein the alkylene glycol is ethylene glycol.

5. The process of claim 1 wherein a composition selected from the group consisting of an esterification catalyst, a polycondensation catalyst, an ether inhibitor and mixtures thereof is added to the reaction mixture in step (a).

6. The process of claim 5 wherein said composition is diisopropylamine.

7. The process of claim 1 wherein the esterified product from step (c) is processed through three stages of polycondensation in step (d) until there is obtained an improved polyester suitable for the production of tire yarn.

8. The process of claim 7 wherein in the final stage of polycondensation in step (d), the reaction mixture is distributed in thin layers.

* * * * *